United States Patent [19]
Cullen et al.

[11] Patent Number: 5,686,161
[45] Date of Patent: *Nov. 11, 1997

[54] MOISTURE-SENSITIVE LABEL

[75] Inventors: John S. Cullen, Buffalo; Ronald C. Idol, Amherst; Thomas H. Powers, Mayville, all of N.Y.

[73] Assignee: Multisorb Technologies, Inc., Buffalo, N.Y.

[*] Notice: The term of this patent shall not extend beyond the expiration date of Pat. No. 5,667,863.

[21] Appl. No.: 55,055

[22] Filed: Apr. 29, 1993

Related U.S. Application Data

[63] Continuation-in-part of Ser. No. 748,760, Aug. 23, 1991, which is a continuation-in-part of Ser. No. 638,494, Jan. 7, 1991, abandoned.

[51] Int. Cl.$^6$ ................................................ B32B 3/02
[52] U.S. Cl. ............... 428/68; 252/188.1; 252/188.28; 428/72; 428/76; 428/188; 428/192; 428/194; 428/212; 428/219; 428/220; 428/323; 428/913
[58] Field of Search ................................ 428/68, 76, 72, 428/188, 192, 194, 212, 220, 219, 913, 323; 252/188, 28, 188.1

[56] References Cited

U.S. PATENT DOCUMENTS

| | | | |
|---|---|---|---|
| 1,821,388 | 9/1931 | Maude et al. | 252/188.28 |
| 2,825,651 | 3/1958 | Loo et al. | 99/171 |
| 3,480,402 | 11/1969 | Jackson | 116/206 |
| 4,127,503 | 11/1978 | Yoshikawa et al. | 252/429 R |
| 4,166,807 | 9/1979 | Komatsu et al. | 252/439 |
| 4,192,773 | 3/1980 | Yoshikawa et al. | 252/429 R |
| 4,230,595 | 10/1980 | Yamaji et al. | 252/188 |
| 4,279,350 | 7/1981 | King | 215/228 |
| 4,317,742 | 3/1982 | Yamaji et al. | 252/188 |
| 4,406,813 | 9/1983 | Fujishima et al. | 252/188.28 |
| 4,421,235 | 12/1983 | Moriya | 206/524.2 |
| 4,510,162 | 4/1985 | Nezat | 426/124 |
| 4,588,561 | 5/1986 | Aswell et al. | 422/238 |
| 4,711,741 | 12/1987 | Fujishima | 252/188.28 |
| 4,752,002 | 6/1988 | Takahashi et al. | 206/204 |
| 4,769,175 | 9/1988 | Inoue | 252/188.28 |
| 4,792,484 | 12/1988 | Moritani | 428/323 |
| 4,813,791 | 3/1989 | Cullen et al. | 383/40 |
| 4,815,590 | 3/1989 | Peppiatt et al. | 206/204 |
| 4,977,009 | 12/1990 | Anderson et al. | 429/76 |
| 4,992,410 | 2/1991 | Cullen et al. | 502/407 |
| 5,085,878 | 2/1992 | Hatakeyama | 252/188.18 |
| 5,089,323 | 2/1992 | Nakae | 428/220 |
| 5,102,673 | 4/1992 | Sugihara | 252/188.28 |
| 5,116,660 | 5/1992 | Kumatsu | 428/192 |
| 5,143,769 | 9/1992 | Moriya | 252/188.28 |

FOREIGN PATENT DOCUMENTS

| | | |
|---|---|---|
| 54-13272 | 2/1979 | Japan . |
| 119418 | 3/1979 | Japan . |
| 55-116435 | 9/1980 | Japan . |
| 56-17633 | 2/1981 | Japan . |
| 64-20468 | 2/1989 | Japan . |
| 1159053 | 6/1989 | Japan . |

OTHER PUBLICATIONS

Hawley, "The Condensed Chemical Dictionary", 8th Ed., 1971 p. 267.

*Primary Examiner*—Nasser Ahmad
*Attorney, Agent, or Firm*—Joseph P. Gastel

[57] ABSTRACT

An oxygen-absorbing label and a moisture-sensitive label. The oxygen-absorbing label consists of a base sheet, adhesive on the base sheet for securing the base sheet to an internal surface of a container, an oxygen-absorbing composition on the base sheet, and a permeable cover sheet secured to the base sheet to confine the oxygen-absorbing composition therebetween. The moisture-sensitive label is one wherein a moisture-sensitive material is used as part of the label instead of the oxygen-absorbing composition. The moisture-sensitive material may be a moisture adsorber such as silica gel or molecular sieve, or it may be a moisture supplier such as hydrogel. A plurality of the foregoing labels are mounted on a web to be used with conventional labeling equipment.

17 Claims, 3 Drawing Sheets

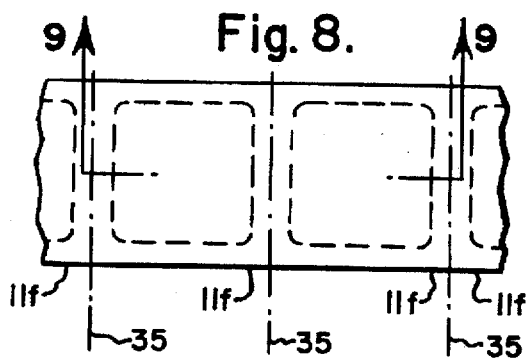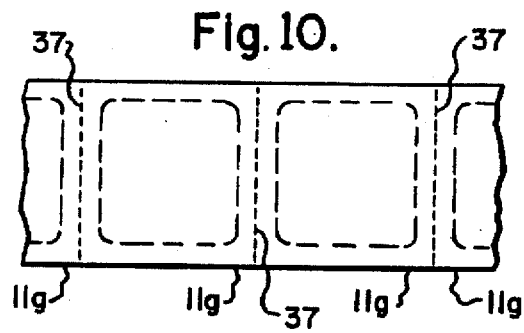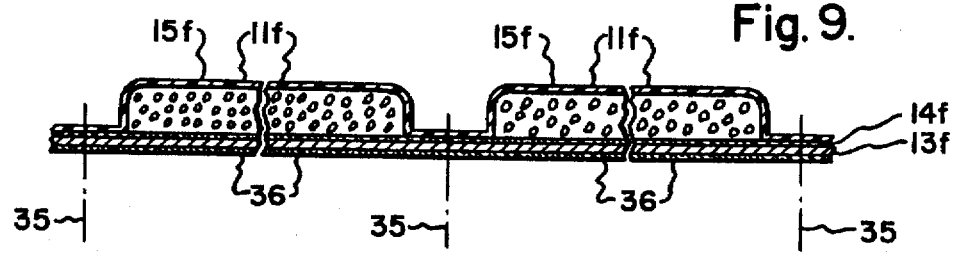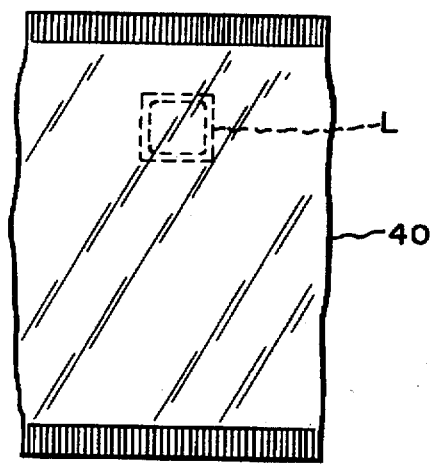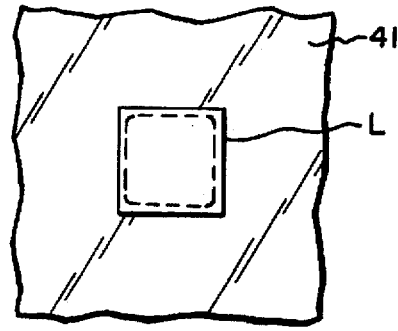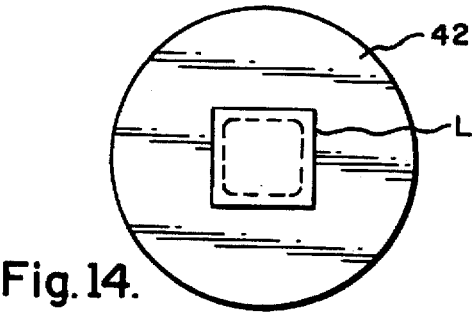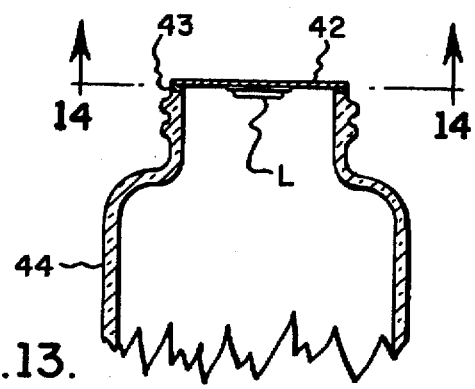

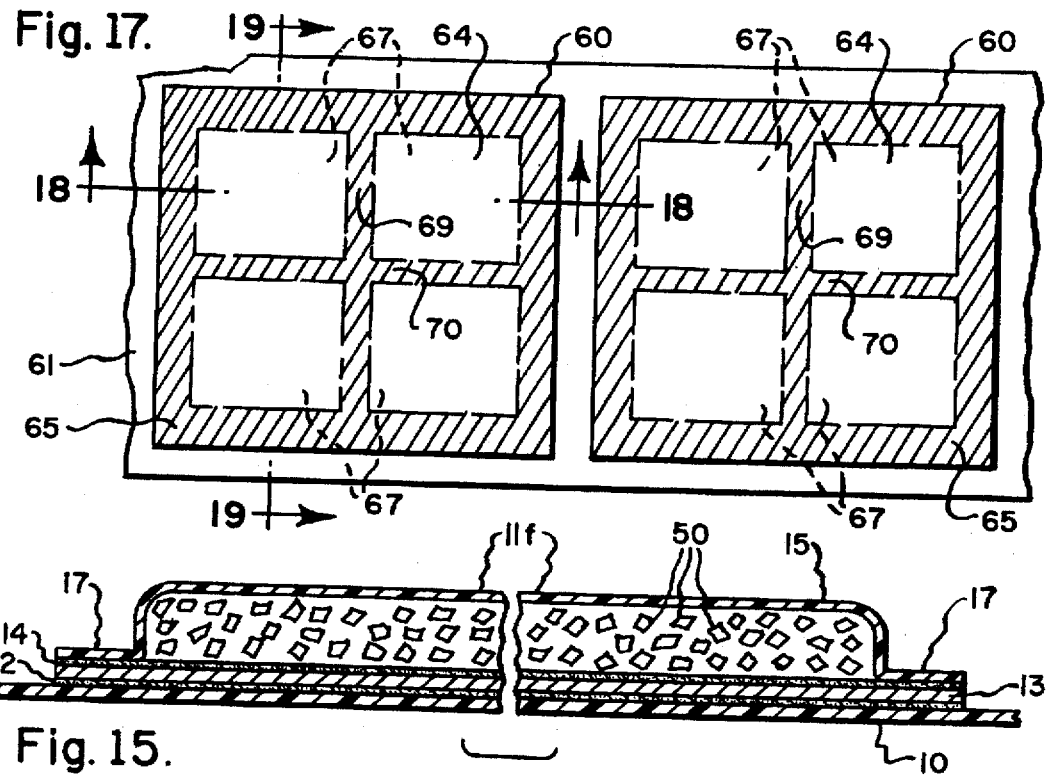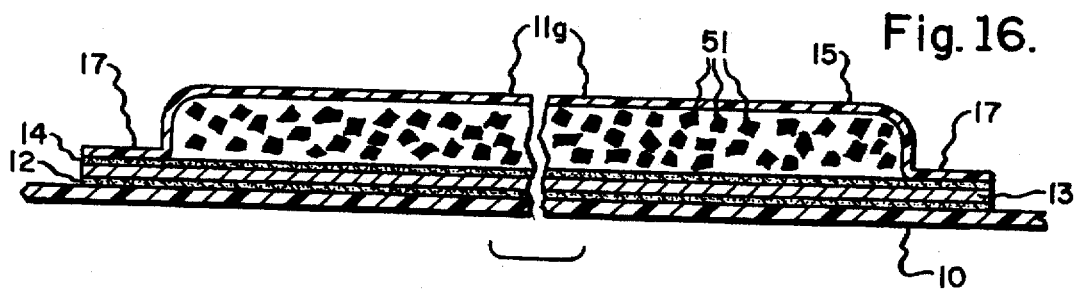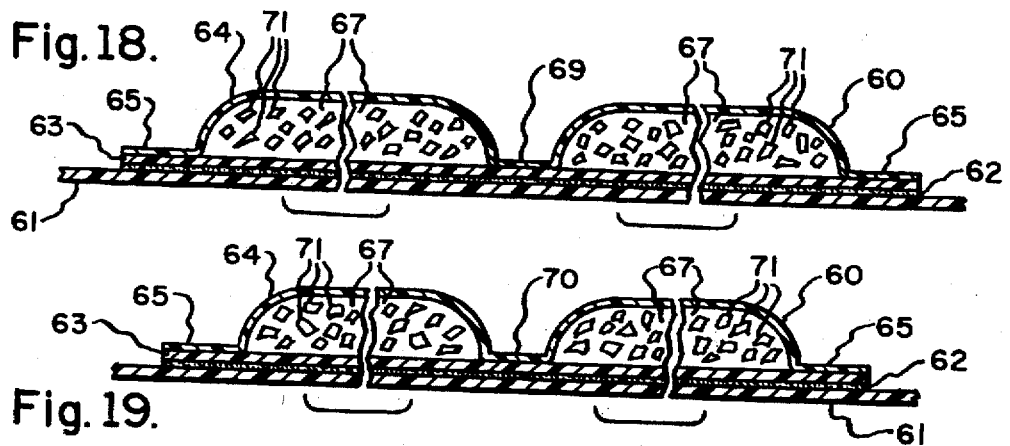

MOISTURE-SENSITIVE LABEL

CROSS REFERENCE TO RELATED APPLICATION

The present application is a continuation-in-part of application Ser. No. 748,760, filed Aug. 23, 1991 pending, which is a continuation-in-part of application Ser. No. 638,494, filed Jan. 7, 1991, now abandoned.

BACKGROUND OF THE INVENTION

The present invention relates to a label which contains a moisture-sensitive material, either in the nature of a moisture-adsorber or a moisture-supplier, and to a web containing a plurality of such labels.

In prior patent applications Ser. No. 748,760, filed Aug. 23, 1991, and Ser. No. 638,494, filed Jan. 7, 1991, oxygen-absorbing labels are disclosed which incorporate particulate moisture-sensitive materials in the form of moisture-adsorbers or a moisture-provider for activating the oxygen-absorbing materials. The oxygen-absorbing labels were conceived for use in applications wherein oxygen-absorption was required, as with food products, pharmaceuticals, or the like and wherein previously oxygen-absorption was generally achieved by the loose placement of an oxygen-absorbing packet or canister into a container from which oxygen was to be absorbed. This was often undesirable as the packet or canister mixed with the contents of the container.

Prior U.S. Pat. No. 4,769,175 disclosed a sheet-like oxygen scavenger which could be securely fixed to the inner wall of a container of food or other articles. Also U.S. Pat. No. 5,116,660, issued May 26, 1992, also discloses oxygen-absorbing material which is embedded in a matrix. However, in both of these patents the matrix embeds the oxygen-absorbing materials and thus blocks their oxygen-absorbing capabilities.

In the above cited prior U.S. patent applications Ser. Nos. 748,760 and 638,494, oxygen-absorbing labels are disclosed which utilize exposed unembedded oxygen-absorbing materials which provide enhanced oxygen-absorption because they are not embedded in a matrix. In these embodiments particulate moisture-sensitive materials are admixed with the oxygen-absorbing materials. These moisture-sensitive materials fall into two categories. The material of one category is to adsorb moisture from a moist environment to activate the oxygen-absorbing materials. These moisture-adsorbing materials are silica gel, molecular sieve, etc. The material of the other category is a moisture-provider which supplies moisture to the oxygen-absorbing materials when the latter are utilized in a dry environment which cannot supply moisture to activate oxygen-absorption. This moisture-supplying material is hydrogel.

The present invention, which relates to moisture-sensitive labels containing either a moisture-adsorber or a moisture-provider, is in accordance with the teachings of the prior two cited patent applications.

SUMMARY OF THE INVENTION

It is one object of the present invention to provide a moisture-sensitive label construction, either in the nature of a moisture-adsorber or a moisture-supplier, which can be produced on a high speed continuous basis and can be applied to base containers on a high speed continuous basis and which contains a thin layer of moisture-sensitive material for either adsorbing moisture or supplying moisture.

It is another object of the present invention to provide a moisture-sensitive label containing an orientation of moisture-sensitive material which is integrated in such a manner so as to attract moisture into the label or supply moisture from the label in an efficient manner depending on whether the label contains a moisture-adsorber or a moisture-supplier, respectively.

A further object of the present invention is to provide a moisture-sensitive label which, because of the orientation of the components therein, can be assembled in an extremely efficient and simple manner.

Yet another object of the present invention is to provide a web which contains a plurality of moisture-sensitive labels for facilitating the handling of the labels by the use of conventional label-applying machinery. Other objects and attendant advantages of the present invention will readily be perceived hereafter.

The present invention relates to a moisture-sensitive label comprising a base sheet, a gas-permeable cover sheet secured to said base sheet to define a space therebetween, and moisture-sensitive material in exposed particulate form confined in a layer between said base sheet and said cover sheet.

The various aspects of the present invention will be more fully understood when the following portions of the specification are read in conjunction with the accompanying drawings wherein:

BRIEF DESCRIPTION OF THE DRAWINGS

FIG. 8 is a fragmentary plan view of a modified form of web;

FIG. 9 is an enlarged fragmentary cross sectional view taken substantially along line 9—9 of FIG. 8;

FIG. 10 is a fragmentary plan view of a further embodiment of a web;

FIG. 11 is a front elevational view of a container having an improved oxygen-absorbing label of the present invention secured to a wall thereof;

FIG. 12 is a fragmentary enlarged view showing the oxygen-absorbing label mounted on the wall of the container of FIG. 11;

FIG. 13 is a fragmentary cross sectional view showing an oxygen-absorbing label of the present invention mounted on a safety seal secured to the mouth of a bottle;

FIG. 14 is a view taken substantially in the direction of arrows 14—14 of FIG. 13 and showing the label mounted on the safety seal;

FIG. 15 is a fragmentary cross sectional view similar to FIG. 7 but showing a label which contains moisture-sensitive material in the form of a particulate desiccant for adsorbing moisture;

FIG. 16 is a fragmentary cross sectional view similar to FIG. 7 but showing a label which contains moisture-sensitive material in the form of a particulate moisture-supplier for providing moisture to a container;

FIG. 17 is a fragmentary plan view of an alternate embodiment of the present invention;

FIG. 18 is a fragmentary cross sectional view taken substantially along line 18—18 of FIG. 17; and FIG. 19 is a cross sectional view taken substantially along line 19—19 of FIG. 17.

DESCRIPTION OF THE PREFERRED EMBODIMENTS

By way of introduction, all embodiments of the labels of the present invention are flexible and can be produced on a high speed continuous basis and can be applied to containers on a high speed continuous basis. Certain of the embodiments can also be fabricated by printing techniques, and all embodiments are highly efficient because they utilize thin layers of oxygen-absorbing components or moisture-sensitive materials. The moisture-sensitive labels containing a layer of particulate material for either adsorbing moisture or supplying moisture to a container are part of the teaching of the oxygen-absorbing labels. The various dimensions and techniques described relative to the structure and fabrication of the oxygen-absorbing labels described hereafter are equally applicable to the moisture-adsorbing and moisture-supplying labels of the present invention except where those techniques are inconsistent therewith.

By way of further introduction, the oxygen-absorbing labels of the present invention are intended for use in either low-moisture or high-moisture environments. In this respect, in certain containers, there is a high moisture content, and in these the labels of the present invention can contain a moisture absorbent such as silica gel or molecular sieve to absorb moisture from the container to activate the oxygen-absorbing action. In other containers, such as those having fried foods such as potato chips or the like, there is very low moisture, and in these the labels of the present invention may contain a moisture-carrying material, such as hydrogel to release moisture to activate the oxygen-absorbing action. Both of these types of material will be considered under the general nomenclature of moisture-sensitive materials, and such materials will be capable of use in any of the embodiments of the present invention, as required for specific low moisture or high moisture environments, unless their interchangeability is inconsistent with the specific embodiment.

Figure 1:
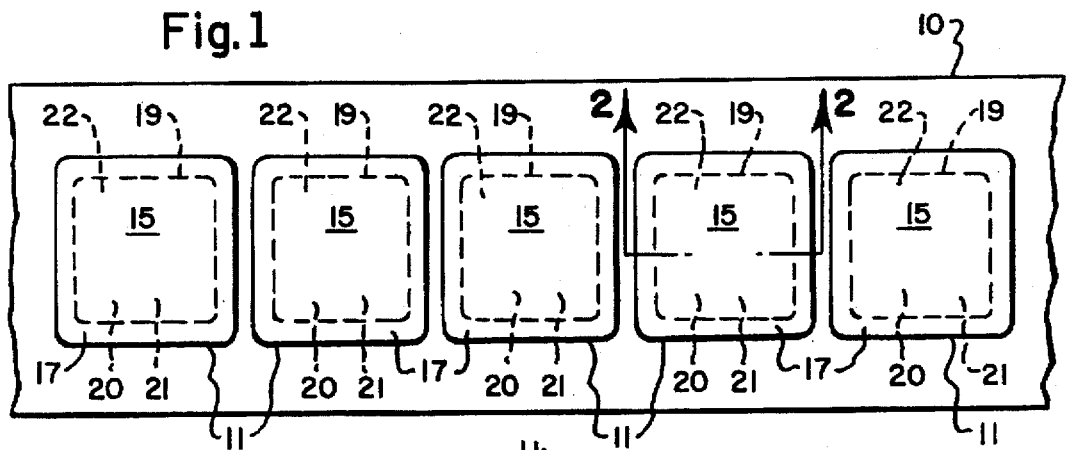
FIG. 1 is a fragmentary plan view of a web containing a plurality of oxygen-absorbing labels of the present invention.

In FIG. 1 a web 10 is shown containing a plurality of flexible labels 11 of the present invention, which may be oxygen-absorbing labels, moisture-adsorbing labels or moisture-supplying labels. Each label 11 is secured to web 10, which is fabricated of release paper so that each label 11 can be removed therefrom, by a 1 to 2 mil layer 12 of adhesive which may be any suitable pressure-sensitive adhesive. The adhesive 12 forms the underside of base sheet 13 which may be made of suitable paper or flexible plastic film 1 to 5 mils in thickness and preferably 2 to 3 mils in thickness. The flexible base sheet 13 may be moisture or vapor impervious or it may be moisture-absorbent, if moisture will not deteriorate it. If the labels are to be attached to their base container by hot melt adhesive or heat-sealable polymer, layer 12 can be made of such substances and layer 12 can be releasably secured to web 10 by any suitable means, such as an additional layer or spots of suitable adhesive. The adhesive attachment to the web 10 is by way of example only, and it will be appreciated that the labels may be attached to each other at their borders and thus the labels themselves may be formed into a web, as described more fully hereafter relative to FIGS. 8–10. In these embodiments, the labels may be separated from the web by suitable cutting machinery or they can be torn from the web along perforations between the labels.

The upper surface of base sheet 13 contains another layer of adhesive 14 which may be of the same type and thickness as adhesive film 12 which, as noted above, may be hot melt adhesive or heat-sealable polymer. Also sheet 13 can be attached to its base container and to top sheet 15 by any other suitable means including but not limited to heat-sealing, ultrasonic welding, and the various forms of attachment can be used by themselves or in suitable combinations with each other. The various forms of adhesive may include, without limitation, pressure sensitive adhesive, hot melt adhesive, cold glue and catalytically cured resin. Furthermore, the sealing by adhesive or by the other methods noted above may be by full coats or pattern coats.

A flexible top sheet 15 is secured to base sheet 13 by means of the adhesive layer 14 and this securement is around peripheral edge 17. By way of example and not limitation, top sheet 15 is fabricated from oil and water impermeable paper, coated paper, or plastic film, such as polyethylene, polypropylene, EVA (ethylene vinylacetate) or polyethyleneterephthalate, surlyn, paper, or laminates thereof which may or may not be microperforated, which is vapor and gas permeable so that oxygen gas will pass therethrough but liquid water will not. Furthermore, by being oil and water impermeable, the upper sheet 15 will not stain and thus will resist discoloration to prevent an unsightly appearance in use. The staining which is resisted is that due to the oxidation of the iron contained in the label or due to contact with the contents of the container in which the label is placed. The top sheet may be between 5 and 7 mils in thickness and more preferably between 1 and 5 mils in thickness and most preferably between 3 and 4 mils in thickness.

The top sheet 15, by virtue of its attachment to bottom sheet 13 at peripheral edge 17, encloses the oxygen-absorbing components 19 therein. The components of FIG. 2 include the two dry reactants, iron 20 and a solid electrolytic salt 21. The iron may be either hydrogen reduced iron or electrolytically reduced iron, or chemically reduced iron which will provide greater reactivity. While iron is preferred as the metallic oxygen-absorbing agent, it will be appreciated that other metals may be used. These are, by way of example and not limitation, aluminum, copper, zinc, titanium, magnesium and tin. However, they do not have the oxygen-absorbing capacity of iron. Also, other elements which can be used in elemental or partially oxidized form are sodium, manganese, iodine, sulfur and phosphorous. However, these also are not as effective as iron.

The salt may be sodium chloride, or any other suitable food compatible salt including but not limited to sodium sulfate, potassium chloride, ammonium chloride, ammonium sulfate, calcium chloride, sodium phosphate, calcium phosphate and magnesium chloride. For non-food products, other non-food compatible salts can be used. The dry reactants, namely, the iron and the salt may be between 48 and 325 mesh and may be deposited to a thickness of between 2 and 12 mils and preferably between 4 and 8 mils.

Figure 4:
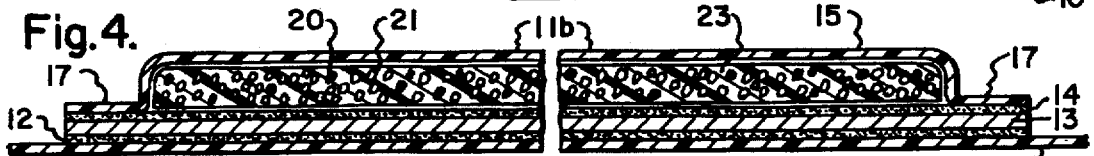
FIG. 4 is a view similar to FIG. 2 but showing a third embodiment.

The mesh sizes of the components may be the same as set forth hereafter relative to the embodiment of FIG. 4. The dry reactants 20 and 21 will adhere to the surface of the adhesive layer 14 and thus be maintained within the borders 17. Where the layer of dry reactants 20 and 21 is sufficiently thin, it will be held in position between sheets 13 and 15, and this thinness is less than about 12 mils. In other words, the particulate material will remain in substantially layer form without bunching up, especially when the label is adhered to its container base. Also, the roughness of the surfaces of the sheets 13 and 15 may prevent the particulate material from sliding out of its layer configuration. The particulate materials may be deposited by automatic machinery on a continuous intermittent basis on bottom sheet 13. Sheet 22 may also be deposited by automatic machinery.

Also included within the confines of upper sheet 15 is an absorbent sheet 22 of blotter paper or desiccant paper which is sized and/or coated as necessary. The paper sheet may also be fabricated with an electrolyte therein. A desiccant paper which contains silica gel and is identified by the grade designation SG-146 and is a product of Multiform Desiccants, Inc. may be used. The function of the blotter or desiccant paper is to attract moisture through top sheet 15 so as to combine with the solid electrolyte to thereby initiate the basic electrolytic action which is necessary for the iron to absorb oxygen which passes through top sheet 15. Absorbent sheet 22 may be between and 4 and 15 mils in thickness and more preferably between 8 to 10 mils in thickness.

When the foregoing dimensions of the various components are considered in combination, it can be seen that the label 11 has an outside range of thicknesses of between 9.5 and 46 mils, an intermediate range of thicknesses of between 18 and 31 mils and an inner range of thicknesses of between 20 and 30 mils. The thicknesses of the various layers may vary, especially the thickness of the blotter paper and/or iron and salt, depending on the amount of absorption which is required.

Figure 2:
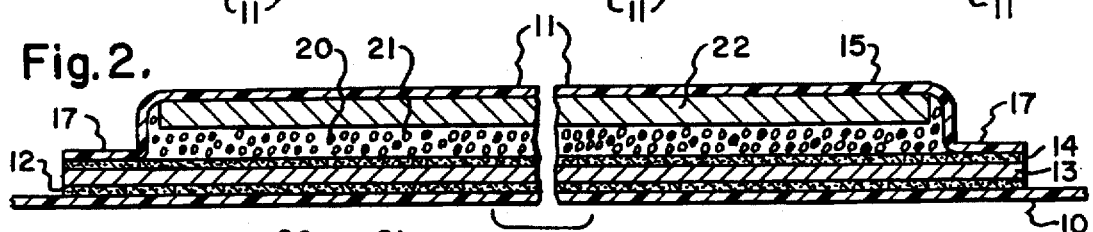
FIG. 2 is a fragmentary cross sectional view taken substantially along line 2—2 of FIG. 1 and showing one embodiment of an oxygen-absorbing label of the present invention.
Figure 3:
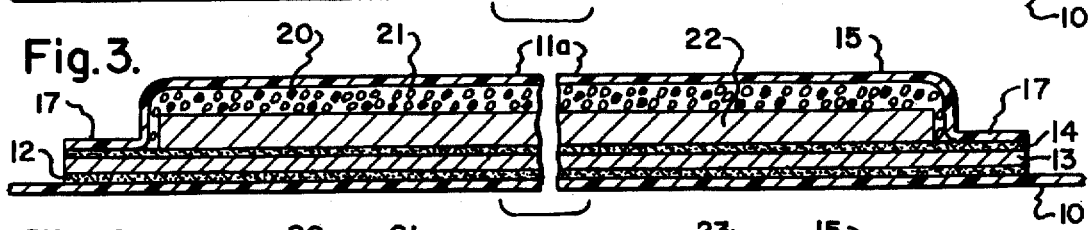
FIG. 3 is a view similar to FIG. 2 but showing a second embodiment.

In FIG. 3 a second embodiment 11a of the present invention is disclosed. Label 11a has the identical components of the label of FIG. 2 and therefore these components will be designated by identical numerals which obviates the necessity to describe them in detail, as was done relative to FIG. 2. The only difference between the embodiments of FIGS. 2 and 3 is that the absorbent sheet 22 is underneath the dry reactants 20 and 21 rather than above them as in FIG. 2. In this embodiment there is no adhesive layer, such as 14 next to the granular material 20 and 21. The advantage of the embodiment of FIG. 3 over FIG. 2 is that the absorbent sheet, by attracting moisture from the environment in which the label is located, will cause the moisture to first travel through the granular material 20 and 21, thereby hastening the reaction. On the other hand, the advantage of the embodiment of FIG. 2 over that of FIG. 3 is that the absorbent sheet 22 will hold the granular or powdered material 20 and 21 in position during the assembly of the top sheet 15 with bottom sheet 13. The sheet 22 may be positioned on bottom sheet 13 by automatic machinery and the particulate material may also be deposited by automatic machinery. Various dimensions for the labels of FIGS. 2 and 3 have been given above and expanded ranges are given in the following table.

TABLE I

RANGES OF THICKNESS OF LAYERS IN FIGS. 2 AND 3 IN MILS

| LAYER | RANGE | MORE PREFERRED RANGE | MOST PREFERRED RANGE |
|---|---|---|---|
| 12 & 14 adhesives | .5 to 2 | .5 to 1.5 | .8 to 1 |
| 13 base sheet | .5 to 5 | 1 to 4 | 1 to 3 |
| 15 top sheet | 1 to 9.5 | 2 to 7 | 2 to 4 |
| 19 (20 & 21) reactants | 1 to 32 | 2 to 12 | 4 to 8 |
| 22 absorbent sheet | 1 to 32 | 5 to 15 | 7 to 10 |
| TOTAL | 4.5 to 82.5 | 11 to 41 | 15.6 to 27 |

Another embodiment of the present invention is disclosed in FIG. 4. The flexible label 11b of this embodiment contains certain components which are identical to those of FIG. 2, and such components are designated by identical numerals, thereby obviating the necessity for a detailed description of these components. The embodiment of FIG. 4 differs from the preceding two embodiments in that it does not contain a sheet of absorbent paper. Instead it has an active layer 23 consisting of a polymer matrix which can be latex, PVP, acrylic, vinyl, styrene, dextrins or other natural polymers, PTFE (polytetrafluoroethylene), polyolefins or acetates containing dispersed iron, of the type discussed above, electrolyte of the type discussed above and a suitable moisture-sensitive material such as silica gel, hydrogel, molecular sieve, or any other suitable composition having an affinity for carrying moisture. In this respect, in certain applications it is desired for the material to be a moisture-attracting material, such as silica gel or molecular sieve, to absorb moisture from the environment, and in other applications where the environment does not have sufficient moisture, it is desired for the material to be a moisture-carrying material, such as hydrogel. Both of the foregoing materials are characterized as being moisture-sensitive materials. In fact, in any of the embodiments of the present invention, where applicable, either a moisture-absorbing or moisture-carrying material may be used. The layer 23 may be 4 to 16 mils in thickness, and preferably between 4 and 12 mils in thickness and most preferably between 4 to 10 mils in thickness. All of the reactants in the matrix may have an outside range of between 48 and 375 mesh, an intermediate range of between 100 and 350 mesh, and an inner range of between 200 and 325 mesh. The thickness of layer 23 and the mesh size of the ingredients in the matrix will depend on the use to which label 11b is placed. The layer 23 is fabricated by mixing the ingredients with the matrix and then suitably calendaring it, casting it or extruding it in the conventional manner in which such matrices are made. If the matrix is not porous, it can be perforated to expose the active ingredients. If it is porous, then it need not be further treated to expose the active ingredients. If the matrix is relatively sparse with respect to the ingredients, the latter will merely be bound by the matrix, but will be sufficiently exposed to react with the oxygen. The sheet can be adhered to adhesive layer 14 or merely located thereon conveniently prior to assembling top sheet 15 with bottom sheet 13. The matrix may be deposited by automatic machinery. Various dimensions for the label of FIG. 4 have been given above and expanded ranges are given in the following table.

TABLE II

RANGES OF THICKNESS OF LAYERS IN FIG. 4 IN MILS

| LAYER | RANGE | MORE PREFERRED RANGE | MOST PREFERRED RANGE |
|---|---|---|---|
| 12 & 14 adhesives | .5 to 2 | .5 to 1.5 | .8 to 1 |
| 13 base sheet | .5 to 5 | 1 to 4 | 1 to 3 |
| 15 top sheet | 1 to 9.5 | 2 to 7 | 2 to 4 |
| 23 active layer | 2 to 54 | 5 to 24 | 8 to 20 |
| TOTAL | 4.5 to 72.5 | 9 to 38 | 17.6 to 29 |

Figure 5:
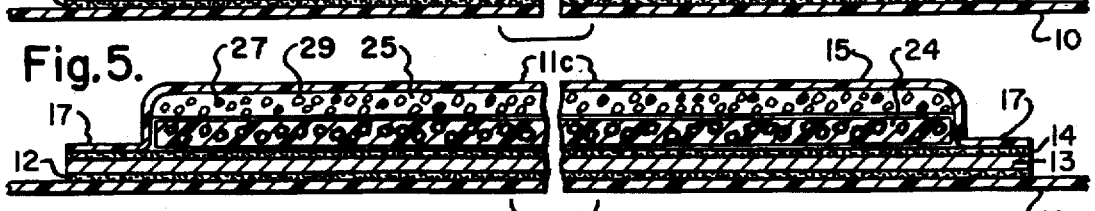
FIG. 5 is a view similar to FIG. 2 but showing a fourth embodiment.

In FIG. 5 a further embodiment 11c of the flexible label of the present invention is disclosed which has certain components which are identical to those of the preceding components and are identified by like numerals to obviate the necessity to describe them again. In this embodiment lower layer 24 is a separate flexible sheet consisting of a polymer matrix such as latex, PVP, acrylic, vinyl, styrene, dextrins, and other natural polymers, PTFE, polyolefins or acetates containing a hydrous or hydratable absorbent such as silica gel, hydrogel, molecular sieve, or any other suitable moisture-sensitive composition. This sheet may be between 1 and 6 mils thick or may have an inner range of thicknesses of between about 3 and 4 mils and may be deposited by a suitable coating process including but not limited to painting and printing. The advantages of having the material within a sheet 24 is to facilitate the assembly of label 11c by providing a fixed body as contrasted to loose granular material. The size of the hydrous or hydratable absorbent may be the same as in the preceding embodiments. Label 11c includes a layer 25 of granular materials consisting of a combination of oxidizable metal 27 and a electrolyte 29. These components may be of the exact same type and sizes described above with respect to FIG. 2 and may be within the same ranges of sizes of the embodiment of FIG. 2. As an alternate embodiment, the sheet 24 may contain the granular iron and electrolyte and the moisture-sensitive material may be laid on top of it. The polymer material may have a sufficient coefficient of friction to prevent the granular material thereon from sliding. The polymeric material of FIG. 5 may be deposited by a press or by a silk screen process or coated or painted on its base.

Figure 6:
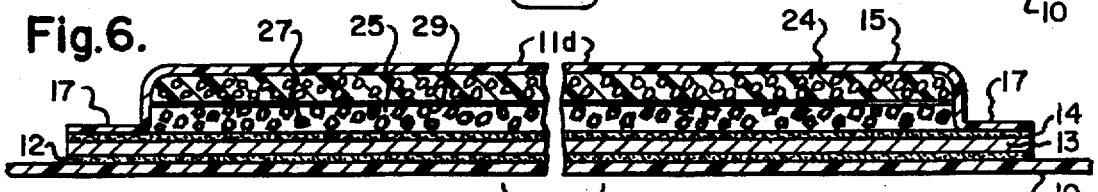
FIG. 6 is a view similar to FIG. 2 but showing a fifth embodiment.

In FIG. 6 another embodiment 11d is shown. In this embodiment all components which have the same numerals as the embodiment 11c of FIG. 5 are designated by like numerals. The only difference between the embodiments of FIG. 5 and FIG. 6 are that the layers 24 and 25 are reversed. Layer 24 can be coated on the top sheet or sprayed on the particulate material. The granular or particulate material will adhere to the adhesive in the embodiment of FIG. 6 to thereby be maintained in layer form. Various dimensions of the labels of FIGS. 5 and 6 have been given above and expanded ranges are given in the following table.

TABLE III

RANGES OF THICKNESS OF LAYERS IN FIGS. 5 AND 6 IN MILS

| LAYER | RANGE | MORE PREFERRED RANGE | MOST PREFERRED RANGE |
|---|---|---|---|
| 12 & 14 adhesives | .5 to 2 | .5 to 1.5 | .8 to 1 |
| 13 base sheet | .5 to 5 | 1 to 4 | 1 to 3 |
| 15 top sheet | 1 to 9.5 | 2 to 7 | 2 to 4 |
| 24 matrix of moisture sensitive material | .5 to 25 | 1 to 10 | 3 to 5 |
| 25 (27 & 29) reactants | 1 to 32 | 2 to 12 | 4 to 8 |
| TOTAL | 4 to 75.5 | 7 to 36 | 11.6 to 22 |

Figure 7:
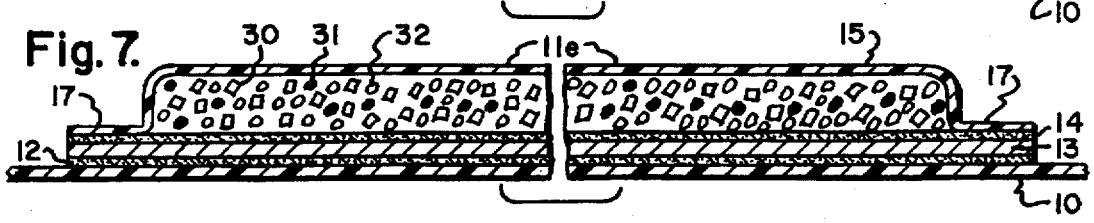
FIG. 7 is a view similar to FIG. 2 but showing a sixth embodiment.

In FIG. 7 another flexible label 11e is disclosed which is another embodiment of the present invention wherein numerals which are identical to those of FIG. 2 represent identical structure. In this embodiment all materials within top sheet 15 and bottom sheet 13 are granular or particulate and they include iron 30, dry salt 31 and a moisture carrier such as hydrogel 32, which are deposited on the adhesive layer 14 which aids in maintaining them in layer form. The iron and the salt may be of the same types and mesh sizes described above relative to FIG. 2. The hydrogel may be of the same mesh sizes as described above relative to FIG. 4. The total thickness of the components 30, 31 and 32 may be between 4 and 20 mils or may have a smaller range of between 6 and 8 mils. The exact thickness can vary depending on the amount of absorption which may be required for any particular application. Instead of using a granular moisture carrier such as hydrogel, a moisture absorber such as silica gel or the like can be used. Whether one or the other is used depends on the environment in which the label is placed, i.e., if it has moisture which it will give up or not. The particulate materials may be deposited by suitable automatic machinery. Various dimensions of the label of FIG. 7 have been given above and expanded ranges are given in the following table.

TABLE IV

RANGES OF THICKNESS OF LAYERS IN FIG. 7 IN MILS

| LAYER | RANGE | MORE PREFERRED RANGE | MOST PREFERRED RANGE |
|---|---|---|---|
| 12 & 14 adhesives | .5 to 2 | .5 to 1.5 | .8 to 1 |
| 13 base sheet | .5 to 5 | 1 to 4 | 1 to 3 |
| 15 top sheet | 1 to 9.5 | 2 to 7 | 2 to 4 |
| 30, 31 & 32 reactants | 2 to 64 | 4 to 24 | 8 to 16 |
| TOTAL | 4.5 to 82.5 | 8 to 38 | 12.6 to 25 |

Specific examples have been made in accordance with the embodiments of FIGS. 2, 3, 5 and 7. In accordance with an embodiment made of FIG. 7, the label had an outside dimension of 2½ inches times 2½ inches and it had an inner chamber 2 inches by 2 inches containing the various ingredients. The chamber contained iron, sodium chloride and silica gel. An example according to FIG. 3 was about 0.027 inches thick, and an example according to FIG. 7 was about 0.021 inches thick, when it carried a moisture-absorbing material rather than hydrogel. Low moisture versions, that is, those which carry their own moisture, would be a little thicker. In addition, the following examples have been made.

EXAMPLE 1

A label of the type shown in FIG. 3 was prepared using an oil and grease resistant paper 4.5 mils thick as the top sheet and a silica gel impregnated paper 9 mils thick with moisture adjusted to about 60%. 100 mesh electrolytic iron blended with 1.5% by weight of 200 mesh sodium chloride electrolyte was layered on top of the silica gel paper to a thickness of 8 mils, and paper 4.5 mils thick coated on both sides with 1 mil of pressure-sensitive adhesive was used as a base sheet. The complete label was about 28 mils thick, and the reactive area was about 2×2" and it contained about 0.68 grams of iron. The label was adhered to the inside wall of a closed 500 cc container of atmospheric air, and it removed more than 99.98% of oxygen from this container in 19 hours.

EXAMPLE 2

An oxygen-absorbing label of the type shown in FIG. 7 was prepared using the same type and size of top sheet and base sheet as set forth in Example 1, and its reactive area was about 2×2" in area. An oxygen-absorbing blend of 0.38 grams of 200 mesh electrolytic iron blended with 1.5% of 200 mesh sodium chloride electrolyte by weight of the iron and 50% by weight of the entire mixture of 48 mesh silica gel was distributed on top of the base sheet where it was partially immobilized by the adhesive layer. The finished structure was about 21 mils thick, and removed over 55 cc of oxygen from a humid sealed ½ liter container of atmospheric air in 24 hours and ultimately removed 99.99% of the oxygen from the container in 96 hours. The adhesive was 2 mils thick on opposite sides of the base sheet.

EXAMPLE 3

An oxygen-absorbing label of the type shown in FIG. 7 was prepared using a nonwoven polyolefin top sheet 6.4 mils thick, and a base sheet of double pressure-sensitive adhesive coated styrene which was 3.4 mils thick which contained 2 mils of adhesive on its reactive side and one mil of adhesive on its outside. The reactive area of the label was approximately 2 inches square and contained about 0.7 grams of 48 mesh silica gel and 0.7 grams of an iron/electrolyte blend containing 0.67 grams of 200 mesh electrolytic iron and 0.03 grams of 325 mesh sodium chloride electrolyte. It had a theoretical oxygen-absorbing capacity of 206.7 cc. At 90% relative humidity the label absorbed 156 cc of oxygen from atmospheric air in 23 hours, and it absorbed a total of 172 cc of oxygen in 43 hours. The layer of the iron/electrolyte blend and the silica gel was 16 mils thick.

EXAMPLE 4

An oxygen-absorbing label of the type shown in FIG. 5 was prepared using the same top sheet and base sheet as described above in Example 3. The reactive area of the label was approximately 1½" square in area. A moisture-active 3 mil layer composed of 0.18 grams of polyuronic acid gel and blended with 0.07 grams of 60 micron hydrogel was printed onto the base sheet by the offset method using a rubber plate, after which a 5 mil thick mixture of 0.35 grams of 200 mesh electrolytic iron, and 1% of 325 mesh sodium chloride, 1% of 200 mesh calcium chloride and 1% of 80 mesh calcium oxide by weight was deposited and was thus immobilized in a thin reactive layer. The resulting label was about 21 mils thick. In a dry sealed environment the label reduced approximately 76% of its theoretical maximum capacity of oxygen in the first 24 hours and 87% after 68 hours.

EXAMPLE 5

An oxygen-absorbing label of the type shown in FIG. 7 was prepared using the same top sheet and base sheet as described in Example 3. The reactive area was about ¾"×¾". The adhesive layer on the reactant side was 2 mils thick and of the acrylic, pressure-sensitive type which has the capability of absorbing a certain amount of moisture on its own and thus could function as the moisture active component. A 6 mil dry film of iron, consisting of 0.05 grams of 200 mesh electrolytic iron with 1.5% salt and 0.05 grams of 100 mesh iron with 1.5% salt, was layered onto the adhesive layer to produce a finished label about 19 mils thick. It absorbed 15 cc of oxygen from a moist container in 24 hours and had an ultimate capacity of 23 cc of oxygen.

As is well known, the stoichiometric equivalent of iron required to remove 100 cc of oxygen is 0.325 grams. In any system, multiples of this amount are used depending on the amount of oxygen which is to be absorbed and the reaction rate, which depends on the manner in which the iron is positioned. More specifically, when the iron is packaged in bulk in a packet contains granular or powdered iron, it has been observed that 0.85 grams are required to absorb 100 cc of oxygen in 24 hours, whereas when it is positioned in a layer in a label wherein the thickness of the iron and salt was 8 mils, 0.67 grams were required to absorb 100 cc of oxygen in 24 hours. The smaller amount of iron which is required is due to the fact that it is distributed in a thin layer so that there is a greater exposure of the surface of the particulate iron to the oxygen.

The efficiency of utilizing relatively thin layers of oxygen absorbing materials in a label format is set forth in the following table wherein:

Column 1 designates the type of label as shown in the various figures of the drawing and each label contained sufficient moisture to produce electrolytic action.

Column 2 designates the size of the reactive area within the label

Column 3 designates the weight in grams of iron 100 mesh or finer.

Column 4 designates the thickness of the oxygen-absorbing material (Fe) in mils excluding the moisture active material Column 5 designates the theoretical oxygen-absorbing capacity of the label in cubic centimeters of oxygen Column 6 designates the cubic centimeters of oxygen absorbed by the label in 24 hours Column 7 designates the total amount in cubic centimeters of oxygen ultimately absorbed by the label.

TABLE V

| | OXYGEN ABSORBING EFFICIENCY | | | | | |
|---|---|---|---|---|---|---|
| 1 | 2 | 3 | 4 | 5 | 6 | 7 |
| FIG. 3 (perforated polyester top sheet) | 1.5 × 2" | .4 | 5 | 123 | 80.8 | N/A |
| FIG. 3 | 2" sq. | .35 | 4 | 103.4 | 70.3 | 99.2 |
| FIG. 7 | 2" sq. | .35 | 4 | 103.4 | 52 | 98.5 |
| FIG. 7 | 2" sq. | .70 | 8 | 206.75 | 164 | 190 |
| FIG. 7 | 1" sq. | .14 | 8 | 42 | 29 | 36 |
| FIG. 5 | 1.5" sq. | .35 | 7 | 103.4 | 67 | 95 |

In the labels, the amount of sodium chloride salt which is required to perform the celectrolytic function should be between 2% and 2.5% by weight of the amount of iron which is being used. However, the amount of sodium chloride is not really critical. There is only a need for the amount to be sufficient to effect the required electrolytic action. In this respect, above about 3.5% there is no increase in the reaction rate and below about 1%, a decrease in the reaction rate has been observed, but the reaction still does occur. If salts other than sodium chloride are used, their weights should be the stoichiometric equivalent of the weight of the sodium chloride.

In dry environments wherein the oxygen absorber label has to supply moisture for the oxygen-absorbing reaction between about 30% and 100% of water by weight of the iron should be present, and preferably between about 40% and 80% by weight and most preferably between about 40% and 60% by weight of the iron. It will be understood that the actual amount of water which is required in a particular formulation depends on the amount of water which the environment is expected to contribute, that is, whether the environment is dry so that all water is required or whether it has some moisture so that only some water is required. Additionally the amount of moisture-sensitive material which is used under the foregoing circumstances depends on its water content and its water affinity. By way of example, considering that it is desired that moisture should preferably be present in an amount of between 40–60% by weight of iron in the oxygen-absorbing mixture containing iron and electrolyte, and considering that a given amount of moisture-absorbing blotter paper can carry 30–35% of its own weight as moisture, and thus it is necessary to use moist blotter paper at about 1.5 times the weight of iron to provide 40–60% of the weight of iron as moisture. However, hydrogel contains 50–60% water and therefore it is necessary to use hydrogel in the amount of only 80–100% of the weight of iron to provide 40–60% of the weight of iron as moisture. Thus, when hydrogel is used rather than blotter paper, the resulting composition has less bulk. Hydrogel is also more useful in a dry environment since it partially binds the water, thereby preventing its loss to the environment by evaporation.

While the above description relative to FIGS. 1–7 has shown the labels which are detachable from a web, it is within the contemplation of the present invention to incorporate the labels themselves as part of a web. Accordingly, one embodiment is shown in FIG. 8 wherein labels 11f may be any one of the labels described above, the only difference being that they are not mounted on a web 10. Instead the bottom sheet 13f, which corresponds to bottom sheets 13 of the preceding embodiments is continuous as is top sheet 15f which corresponds to top sheets 15 of the preceding embodiments. A layer 36 of adhesive may be located on the underside of bottom sheet 13f. The contents within each of the labels 11f may be any of the contents described above. The labels 11f may be separated each other along lines 35 by suitable cutting machinery during the process of installation.

Another embodiment of the present invention is shown in FIG. 10 wherein labels 11g may each be identical to any of the embodiments described above including those of FIG. 8. The only difference between the embodiment of FIG. 10 and the embodiment of FIG. 8 is that the web of labels 11g of FIG. 10 are separated from each other by perforations 37 so that they can be separated from each other.

It is to be especially again noted that all labels disclosed above may be made on a continuous basis by automatic machinery and they can also be applied by automatic machinery. In addition, all embodiments possess thin layers of oxygen-absorbing materials which absorb oxygen in a highly efficient manner, and such thin layers, in addition, are instrumental in causing the labels themselves to be relatively thin.

It is also to be especially noted while the specific embodiments described above have been described as containing an adhesive layer 12 for securing the labels to a base, that is, a foreign body, such as the inside of a container, it will be appreciated that other ways of attaching the labels are within the contemplation of the present invention. In this respect, adhesive can be applied to the labels or to their base, that is, the foreign body, at the time of installation. Alternatively, where the labels are made of suitable material such as plastic, they can be heat-sealed to their base, or foreign body, around their perimeter, and in this sense the perimeter comprises the means for securing the label to a foreign body. Also, the labels can be secured to their bases in any suitable manner of attachment. At this point it is to be again stressed that the positive securing of the labels to their bases, such as a container, prevents them from mixing with the contents of the container by making them an integral part of the latter.

It is to be especially noted that the flexibility of all of the labels of the present invention enhances the ease with which they can be fabricated, handled and applied to foreign bodies. Furthermore, where the foreign bodies are flexible containers, such as the bag of FIG. 11, they will flex with the container and therefore maintain good contact therewith.

Representative ways of using any of the embodiments of the present invention are depicted in FIGS. 11–14. In FIGS. 11 and 12 a package 40 is shown having a label L attached to the inside wall 41 thereof. As noted above, label L can be any one of the preceding embodiments or modifications thereof which is attached to wall 41 by any suitable means, as described above. The label L is attached to wall 41 before the bag is formed, that is, while the material of the bag is still in strip form, and it becomes part of the inside of the bag after fabrication. It will be appreciated that labels L can be secured to the inside of box-like containers in the same manner.

In FIGS. 13 and 14 another way of utilizing a label L is shown. In this respect, it is adhesively secured to the underside of a safety seal 42 secured to the mouth 43 of a bottle 44. The safety seal 42 and its attached label L can comprise a subcombination which is applied to the mouth of the bottle.

In FIG. 15 a further embodiment of the present invention is disclosed. In this embodiment a moisture-adsorbing label 11f is disclosed which is utilized for adsorbing moisture from a container in which the goods, such as a food product or a pharmaceutical, must be kept dry. Label 11f is releasably attached to a web 10, which may be release paper, by a layer of pressure-sensitive adhesive 12 which forms the underside of base sheet 13 having a layer of adhesive 14 on the other side thereof which may be of the same type as adhesive film 12. A flexible top sheet 15 is secured to base sheet 13 by means of adhesive layer 14, and this securement is around peripheral edge 17. All of the foregoing components of the label may be identical to any of the components described above relative to FIGS. 1–7 wherein like numerals designate like elements of structure.

Enclosed within the space between base sheet 13 and top sheet 15 is particulate silica gel for adsorbing moisture from the inner wall of a container to which label 11f is attached by means of the adhesive layer 12. As explained above relative to FIGS. 1–7, the top sheet 15 is permeable so that water vapor will pass through it when it is attracted by silica gel 50. It will be appreciated that other desiccants or moisture adsorbents and absorbents, such as molecular sieve, zeolites, activated carbon, calcium oxide, calcium sulfate, Montmorillonite clay, suitable deliquescent salts, and the like, can be used as moisture absorbents and adsorbents. Encapsulated choline chloride is especially desirable for use as a desiccant in pharmaceutical and food applications wherein limited space is available for absorbing moisture because it has a high equilibrium moisture capacity which is higher than silica gel and is compatible with ingestible food and pharmaceuticals. The sizes of the various components of the label including the physical dimensions and the size of the particulate moisture-adsorbing or absorbing material 50 may be as described above relative to any of the preceding embodiments in FIGS. 1–7, and in fact the particle size may be as large as 12 mesh in certain applications. The particulate adsorbent is maintained in layer form by the adhesive layer 14 to which it adheres. It will be appreciated that the thickness of the particulate layer in FIG. 15 is exaggerated for illustrative purposes. The thickness of the layer may be as large as the sum of the materials of the oxygen absorbers described above.

In FIG. 16 a still further embodiment of the present invention is disclosed wherein a label 11g is shown releasably attached to a web 10 by means of pressure-sensitive adhesive layer 12 on the underside of base sheet 13 having an adhesive layer 14 thereon to which top sheet 15 is secured at border 17. The embodiment of FIG. 16 differs from FIG. 15 in that it contains moisture-supplying or moisture-providing particulate material 51 in the nature of hydrogel. The dimensions of all of the foregoing parts and the parameters of the hydrogel, including the mesh sizes, may be identical to those described above relative to FIGS. 1–7 and FIG. 15. Also, the thickness of the hydrogel layer may be as large as the sum of all of the materials of the oxygen absorbers described above. Also, as noted relative to FIG. 15, the hydrogel is maintained in layer form by the adhesive layer 14 to which it adheres.

The label 11g which contains the hydrogel moisture-supplying material can be utilized in any environment wherein the materials are to be supplied with moisture so that they do not dry out. It will be appreciated that the amount of hydrogel which is utilized would depend on the volume of the container.

The hydrogel is a flowable amorphous silicon dioxide which is a form of silicic acid containing between 50% and 70% of moisture and which will release moisture. It is the reaction product of sulfuric acid and sodium silicate under acid conditions, and after removing the sodium sulfate by washing, it has about 30% silica and 70% water. It is a relatively hard truculent mass which can be milled to give free flowing powder.

Other moisture suppliers which can be used include but are not limited to the following materials which are loaded with moisture: cellulose, polyacrylates, diatomaceous earth, zeolites, silica gel, Montmorillonite clay, deliquescent salts, etc. All of the foregoing are flowable particulate materials after being loaded with moisture, and they can have the range of sizes set forth above relative to the moisture absorbers and adsorbers.

A moisture-adsorbing label has been fabricated in accordance with FIG. 15 having the following parameters. The base sheet 12 was 3.5 mils thick and the cover sheet was between 2.5 and 3.5 mils thick. The pressure-sensitive adhesive on the underside of the base sheet was 1.5 mils thick and the pressure-sensitive adhesive between the base sheet and the cover sheet was 1.5 mils thick. The outer dimensions of the rectangular label were 1.75 inches long and 1.5 inches wide. The area of the molecular sieve between the base sheet and the cover sheet was between 0.875 and 1 square inches and it contained 0.1 gram of molecular sieve having a pore size of 4 angstrom units and a particle size of between 40 and 80 mesh. The adhesive layers 12 and 14 were acrylic emulsions known as Green Bay P-506 adhesive, which is compatible with pharmaceuticals. The thickness of the molecular sieve deposit was between 24 and 28 mils, and it was capable of adsorbing 24 milligrams of moisture. The base sheet was cellulose acetate and the cover top sheet 15 was spun-bonded polyolefin known under the trademark TYVEK.

Instead of the acetate top sheet stated above in the example, an acetate/tyvek laminate can be used having a thickness of 4.5–11.5 mils. The base sheet can be 3.5 mil opticite with the layers of adhesive on both sides. It will be appreciated that other suitable materials can be used.

Other pressure sensitive-adhesives which can be used are a rubber resin emulsion known under the trademark DYNATECH 4210 of Dynatech Adhesives, Inc. and a hot melt adhesive known under the trademark NICOLMELT 82385 of Swift Adhesives. The adhesive which is used should be compatible with the product in the container and should not have a migration characteristic which releases adverse materials to the contents of the container.

The foregoing examples are representative of labels which can be fabricated. It will be appreciated that the various parameters can be altered including the types and thicknesses of the base and cover sheets, the types and sizes of the particulate material, and the types and thickness of the adhesive layers.

In FIGS. 17–19 a further embodiment of the present invention is disclosed. In this embodiment labels 60 are releasably attached to an elongated web 61, which may be release paper, by means of a layer of pressure-sensitive adhesive 62 which is adhesively secured to the underside of base sheet 63. Adhesive 62 may be of any of the types discussed above relative to the above embodiments. Base sheet 63 may be any suitable plastic of the types described above for the cover sheet of FIGS. 1–7. A cover sheet 64 is secured to base sheet 63. Cover sheet 64 may be fabricated of any suitable plastic of the types discussed above relative to FIGS. 1–7. The outer border 65 of cover sheet 64 is attached to the underlying portion of base sheet 63 by ultrasonic welding or heat stitching. Furthermore, four spaces or compartments 67 are provided between cover sheet 64 and base sheet 63 by lines 69 and 70 of heat stitching or ultrasonic welding. It will be appreciated that the foregoing techniques can only be applied to fusible materials, and, in this instance, to the plastic base sheet 63 and plastic cover sheet 64.

The reason for dividing the space defined by border 65 into a plurality of spaces or compartments 67 is to maintain moisture-sensitive material 71 in layer form for maximum exposure through cover sheet 64. In other words, if the label was not essentially quilted into compartments 67 by sealing lines 69 and 70, the particulate moisture-sensitive material might tend to bunch up. The number of compartments or spaces 67 which each label 60 has can be determined by its size, that is, the larger the label, the more compartments it would have.

Where the base sheet and cover sheet are not plastics of the type which can be fused by ultrasonic welding or heat stitching, they can be adhesively secured to each other along areas such as 65, 69 and 70 to provide compartments which will maintain the particulate material in layer form.

Again, it will be appreciated that the dimensions of the various components of the labels 60 and the types and parameters of the moisture-sensitive material can be any of those discussed above relative to any of the relevant embodiments so long as they are not inconsistent therewith.

While the preceding description has been directed to various embodiments of flexible labels on a web, it is within the scope of the present invention to have individual labels, with or without adhesive. Such labels can be used or stacked for dispensing from automatic labeling machinery, or can be applied by hand.

While preferred embodiments of the present invention have been disclosed, it will be appreciated that the present invention is not limited thereto but may be otherwise embodied within the scope of the following claims.

What is claimed is:

1. A moisture-sensitive label comprising a base sheet, a gas permeable cover sheet secured to said base sheet to define a space therebetween, material consisting essentially of moisture-sensitive material means for reacting with the environment in which said moisture-sensitive label is located, said space between said base sheet and said cover sheet containing essentially said moisture-sensitive material means, said cover sheet being secured to said base sheet along a border area which is outwardly of said space and which is free of said moisture-sensitive material means, and an adhesive layer on said base sheet on the opposite side thereof from said space for securing said label to a foreign body.

2. A moisture-sensitive label as set forth in claim 1 wherein said cover sheet is selected from the group consisting of polyethylene, polypropylene, ethylene vinyl acetate, polyethyleneterephthalate, surlyn, paper, coated paper, or laminates thereof.

3. A moisture-sensitive label as set forth in claim 1 wherein said label has a thickness of between about 4.5 mils and 82.5 mils.

4. A moisture-sensitive label as set forth in claim 1 wherein said label has a thickness of between about 7 mils and 41 mils.

5. A moisture-sensitive label as set forth in claim 1 wherein said moisture-sensitive material means comprises a moisture-carrying material for releasing moisture.

6. A moisture-sensitive label as set forth in claim 5 wherein said moisture-carrying material means comprises particulate hydrogel.

7. A moisture-sensitive label as set forth in claim 5 wherein said moisture-carrying material means is selected from the group consisting of cellulose, polyacrylates, diatomaceous earth, zeolites, silica gel and Montmorillonite clay.

8. A moisture-sensitive label as set forth in claim 1 wherein said moisture-sensitive material means comprises a moisture-adsorbing material selected from the group consisting of silica gel, molecular sieve, zeolites, activated carbon, calcium oxide, calcium sulfate, Montmorillonite clay and choline chloride.

9. A plurality of moisture-sensitive labels as set forth in claim 1 including a web on which said labels are releasably secured by said adhesive layer.

10. A moisture-sensitive label as set forth in claim 1 wherein said cover sheet is secured to said base sheet at said border area by a second adhesive layer which extends into said space and adhesively secures said moisture-sensitive material means to said base sheet.

11. A moisture-sensitive label as set forth in claim 10 wherein said cover sheet is selected from the group consisting of polyethylene, polypropylene, ethylene vinylacetate, polyethyleneterephthalate, surlyn, paper, coated paper, or laminates thereof.

12. A moisture-sensitive label as set forth in claim 10 wherein said label has a thickness of between about 4.5 mils and 82.5 mils.

13. A moisture-sensitive label as set forth in claim 10 wherein said label has a thickness of between about 7 mils and 41 mils.

14. A moisture-sensitive label as set forth in claim 10 wherein said moisture-sensitive material means comprises a moisture-carrying material for releasing moisture.

15. A moisture-sensitive label as set forth in claim 14 wherein said moisture-carrying material means comprises particulate hydrogel.

16. A moisture-sensitive label as set forth in claim 10 wherein said moisture-sensitive material means is selected from the group consisting of silica gel and molecular sieve.

17. A plurality of moisture-sensitive labels as set forth in claim 10 including a web on which said labels are releasably secured by said adhesive layer.

* * * * *

UNITED STATES PATENT AND TRADEMARK OFFICE
CERTIFICATE OF CORRECTION

PATENT NO. : 5,686,161
DATED : November 11, 1997
INVENTOR(S) : John S. Cullen et al It is certified that error appears in the above-identified patent and that said Letters Patent is hereby corrected as shown below:

Column 15, line 43 (claim 7), delete "means".

Signed and Sealed this

Seventeenth Day of February, 1998

Attest:

BRUCE LEHMAN

Attesting Officer

Commissioner of Patents and Trademarks